United States Patent [19]

Matsuura et al.

[11] Patent Number: 5,701,066

[45] Date of Patent: Dec. 23, 1997

[54] CONTROL SYSTEM FOR AN INDUCTION MOTOR

[75] Inventors: Sadahiro Matsuura; Shigeru Satou; Yasuhiro Kondou, all of Osaka; Yoshiaki Igarashi, Nara, all of Japan

[73] Assignee: Matshushita Electric Industrial Co., Ltd., Osaka, Japan

[21] Appl. No.: 783,431

[22] Filed: Jan. 16, 1997

Related U.S. Application Data

[62] Division of Ser. No. 570,871, Dec. 12, 1995.

[30] Foreign Application Priority Data

| Dec. 14, 1994 | [JP] | Japan | 6-310400 |
| Apr. 20, 1995 | [JP] | Japan | 7-094713 |

[51] Int. Cl.⁶ .................................................. H02P 7/628
[52] U.S. Cl. ........................ 318/808; 318/800; 318/432
[58] Field of Search ........................ 318/798, 799, 318/800, 801, 806, 807, 808, 432, 433

[56] References Cited

U.S. PATENT DOCUMENTS

| 4,672,287 | 6/1987 | Fujioka et al. | 318/800 |
| 4,753,309 | 6/1988 | Maramoto et al. | 180/79.1 |
| 4,808,903 | 2/1989 | Matsui et al. | 318/800 |
| 4,865,148 | 9/1989 | Maramoto et al. | 180/141 |
| 4,875,539 | 10/1989 | Abukawa et al. | 180/79.1 |
| 4,960,178 | 10/1990 | Abukawa et al. | 180/79.1 |
| 5,033,565 | 7/1991 | Abukawa et al. | 180/79.1 |
| 5,067,576 | 11/1991 | Bober | 180/79.1 |
| 5,150,029 | 9/1992 | Watanabe et al. | 318/800 |

FOREIGN PATENT DOCUMENTS

| 1-214287 | 8/1988 | Japan . |
| 4137465 | 5/1992 | Japan . |
| 4137465 | 12/1992 | Japan . |

OTHER PUBLICATIONS

T. Kanmachi, et al., "Sensor-less Speed Control of an Induction Motor without Secondary Resistances", Nagaoka University of Technology, Japan, pp. 243-246.

*Primary Examiner*—Bentsu Ro
*Attorney, Agent, or Firm*—Merchant, Gould, Smith, Edell, Welter & Schmidt, P.A.

[57] ABSTRACT

A control system for an induction motor of the present invention independently commands the torque current component and the exciting current component of a stator current group supplied to the stator of an induction motor so as to feed-back control the amplitude and phase of the stator current group. The torque current component is commanded to control the output torque of the induction motor in correspondence with the output of a steering force sensor for detecting the steering force. According to an electric power steering apparatus using an induction motor controlled by the control system, a permanent magnet is not used for the motor so additional equipment such as a clutch is not required. Consequently, the structure can be simplified and the size of the unit can be reduced. Further, manual steering operation can be performed in the case of failure.

11 Claims, 11 Drawing Sheets

CONTROL SYSTEM FOR AN INDUCTION MOTOR

This is a Divisional of application Ser. No. 08/570,871, filed Dec. 12, 1995, which application(s) are incorporated herein by reference.

FIELD OF THE INVENTION

The present invention relates to a control system for an induction motor capable of controlling the output torque and rotational speed of an induction motor, and to an electric power steering apparatus for a vehicle which generates a suitable auxiliary steering force corresponding to the steering force by means of the control system so as to implement good steering feeling.

A power steering apparatus utilizing a motor has recently been noted because the fuel consumption is less than that of hydraulic operation or the like. However, the electric power steering apparatus according to the prior art uses a motor having a permanent magnet such as a DC motor. Therefore, if the wiring to the motor is short-circuited for some reason, the steering becomes very heavy due to dynamic braking, since the motor performs dynamic braking as a generator. In the worst case, steering cannot be performed. Japanese Laid-Open Patent No. 4-137465 has disclosed that a clutch is provided between a motor and a steering shaft in order to take countermeasures for safety at the time of failure.

The induction motor has a simple structure, so the production costs are lower and maintenance can easily be carried out. However, controllability is poor. Accordingly, the induction motor is not suitable for precisely obtaining a position, speed or torque control. For example, in the case where the torque control is performed by an inverter control according to the prior art, the controllability is much worse than that of a DC motor. In particular, torque cannot easily be obtained in the low-speed area. For this reason, a driving torque cannot be obtained when starting the motor, so the application of the induction motor is restricted. Consequently, the induction motor is not suitable for an electric power steering apparatus which requires a great torque at the time of starting.

However, vector control has been realized with the advancement of electronics. By using vector control, the poor controllability, including starting torque characteristics, has been overcome, so that the controllability can be obtained that is almost the same as that of the DC motor. Accordingly, the application to speed control and the like has been expanded. However, if vector control is applied to the induction motor, a speed sensor such as an encoder for detecting the rotational speed of the induction motor is required when performing torque control. Consequently, the induction motor is less advantageous than other motors with respect to size and cost. As an example in the application of speed control, a method for estimating the rotational speed of the induction motor from the measured current value or the like without using a speed detector has been investigated.

An example of a control system for an induction motor according to the prior art will be described below.

Japanese Laid-Open Patent No. 1-214287 has disclosed a method for estimating the rotational speed of an induction motor using vector control, in which a rotor flux is obtained from a stator current and a stator voltage, and a rotational speed is estimated from the rotor flux and the integral value thereof.

There is an example in which a three-phase induction motor is regarded as a two-phase induction motor by three-phase to two-phase conversion in order to estimate a rotational speed. The basic formula of the two-phase induction motor is expressed in the following equation (1).

$$\begin{bmatrix} v_{1d} \\ v_{1q} \\ 0 \\ 0 \end{bmatrix} = \begin{bmatrix} R_1 + \left(L_1 - \frac{M^2}{L_2}\right)\frac{d}{dt} & 0 & \frac{M}{L_2}\frac{d}{dt} & 0 \\ 0 & R_1 + \left(L_1 - \frac{M^2}{L_2}\right)\frac{d}{dt} & 0 & \frac{M}{L_2}\frac{d}{dt} \\ -\frac{M}{L_2}R_2 & 0 & \frac{R_2}{L_2} + \frac{d}{dt} & p\theta \\ 0 & -\frac{M}{L_2}R_2 & -p\theta & \frac{R_2}{L_2} + \frac{d}{dt} \end{bmatrix} \begin{bmatrix} i_{1d} \\ i_{1q} \\ \phi_{2d} \\ \phi_{2q} \end{bmatrix} \quad (1)$$

wherein $i_{1d}$ and $i_{1q}$ are d-axis and q-axis stator currents which flow on the stator side, $v_{1d}$ and $v_{1q}$ are voltages, $\phi_{2d}$ and $\phi_{2q}$ are d-axis and q-axis rotor fluxes on the rotor side. $R_1$ and $L_1$ are a resistance and an inductance on the stator side, and $R_2$ and $L_2$ are a resistance and an inductance on the rotor side. M is a mutual inductance, $\theta$ is an rotational angle of a motor, and p is the number of pole pairs. It has been known that a rotor phase resistance $R_2$ which greatly varies with the change in temperature, is removed from equation 1 and the rotational speed is estimated from equation 2. By this method, the rotational speed can be obtained without the influence of the change in rotor phase resistance.

$$\omega_{me} = \frac{(\phi_{1d} - L_1 i_{1d})\frac{d}{dt}\phi_{2q} - (\phi_{1q} - L_1 i_{1q})\frac{d}{dt}\phi_{2d}}{(\phi_{1d} - L_1 i_{1d})\phi_{2d} + (\phi_{1q} - L_1 i_{1q})\phi_{2q}} \quad (2)$$

The following method can be used. More specifically, the prior art for speed control is applied to estimate the rotational speed of the induction motor. By using the speed thus estimated, speed control and torque control can be performed by vector control.

For a method using a motor having a conventional permanent magnet, however, there are the following problems. Although countermeasures can be taken against failure by means of a clutch such as an electromagnetic clutch, there is a chance that the clutch will malfunction. By using the clutch, the structure becomes more complicated and larger. In addition, costs may be increased.

Japanese Laid-Open Patent No. 1-214287 has disclosed a control system for an induction motor whose structure is simple. However, there are problems in that the rotary speed is estimated depending on a constant and the precision in estimation of the rotational speed is poor. According to the method (equation 2) in which the rotor phase resistance is removed, the precision in estimation is considerably poorer when the denominator approaches 0 and the response is poor due to smoothing by a filter or the like.

In order to solve the above-mentioned problems, the electric power steering apparatus of the present invention controls a motor, having no permanent magnet, in correspondence to the steering force and generates the auxiliary steering force on a steering system.

A control system for an induction motor according to the present invention comprises a current detector for measuring or estimating the stator current group supplied to the stator of an induction motor; a dq-axis current converter for converting the output of the current detector into a two-phase alternating current of a predetermined d-axis stator current in a d-axis direction and a q-axis stator current in a q-axis direction whose phase differs by 90° from the d-axis direction, a rotor flux estimator for estimating a d-axis rotor flux in the d-axis direction and a q-axis rotor flux in the q-axis direction; a first speed estimator for calculating a first numerator portion of an estimated speed from the d-axis stator current, the d-axis rotor flux and a constant unique to the induction motor, and dividing the first numerator portion of the estimated speed by the q-axis rotor flux so as to estimate the rotational speed of the induction motor; a second speed estimator for calculating a second numerator portion of an estimated speed from the q-axis stator current, the q-axis rotor flux and a constant unique to the induction motor, and dividing the second numerator portion of the estimated speed by the d-axis rotor flux so as to estimate the rotational speed of the induction motor; an estimated speed switch for switching between output values of the first and second speed estimators so as to determine the rotational speed of the induction motor; and torque control means for determining the amplitude of the torque current component based on a command torque of the induction motor, and changing the phase of the stator current group based on the amplitude of the torque current component, the amplitude of a predetermined exciting current component and the output of the estimated speed switch so as to control the output torque of the induction motor.

The present invention can implement an electric power steering apparatus in which an additional mechanism such as a clutch is not required, the structure is simple and steering can still be performed in the event of failure.

Further, the present invention can implement a control system for an induction motor in which the output torque and rotational speed of the induction motor can always be controlled with precision and the response is good.

By using the control system, an electric power steering apparatus which does not need the speed detector of the motor can easily be implemented.

DETAILED DESCRIPTION OF THE PREFERRED EMBODIMENTS

An electric power steering apparatus according to an embodiment of the present invention will be described with reference to the drawings.

Figure 1:
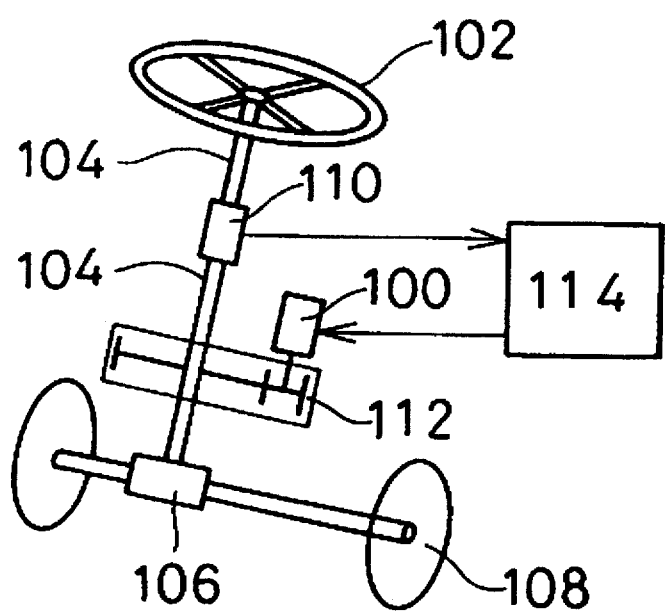
FIG. 1 is a block diagram showing the entire structure of an electric power steering apparatus according to a first embodiment of the present invention.

In FIG. 1 showing the entire structure of an electric power steering apparatus according to a first embodiment of the present invention, an induction motor is indicated at 100, a steering wheel is indicated at 102, a steering shaft is indicated at 104, a steering gear is indicated at 106, a wheel is indicated at 108, a steering force sensor is indicated at 110, a reduction gear is indicated at 112, and an electric controller is indicated at 114.

The operation of the electric power steering apparatus having such a structure will be described with reference to FIG. 1.

In a steering apparatus that does not generate auxiliary steering force, a steering wheel 102 provided on a steering shaft 104 is operated so that a wheel 108 is steered through a steering gear 106. In the electric power steering apparatus according to the present embodiment, an induction motor 100 is coupled to the steering shaft 104 through a reduction gear 112. When the induction motor 100 is driven, an auxiliary steering force is generated. An electric controller 114 controls the induction motor 100 in response to the output of a steering sensor 110 provided on the steering shaft 104. Consequently, the desired auxiliary steering force can be obtained.

When an induction motor having no permanent magnet is used as in the present embodiment, it is in a free condition even if the wiring to a motor is short-circuited for some reason. Consequently, the electric power steering apparatus works as a steering apparatus which cannot reduce an auxiliary steering force. Therefore, it is not necessary to use a clutch as a safety mechanism which separates a motor from a steering shaft. The clutch is required for a DC motor having a permanent magnet, because the motor performs dynamic braking as a generator in the case of short-circuit and steering cannot be operated in the worst case. Consequently, there are some problems with respect to safety.

As described above, when the induction motor is used to generate the auxiliary steering force of the electric power steering apparatus, the safety mechanisms that are not necessary for original functions can be omitted. In addition, the size can be made smaller and the structure becomes more simple.

While the induction motor is used in the present embodiment, a motor having no permanent magnet such as a reluctance motor can also be used.

A second embodiment of the present invention provides an electric power steering apparatus which can easily respond according to a torque command when the torque command is given from a steering sensor to an induction motor.

An electric power steering apparatus according to the second embodiment of the present invention will be described with reference to the drawings.

Figure 2:
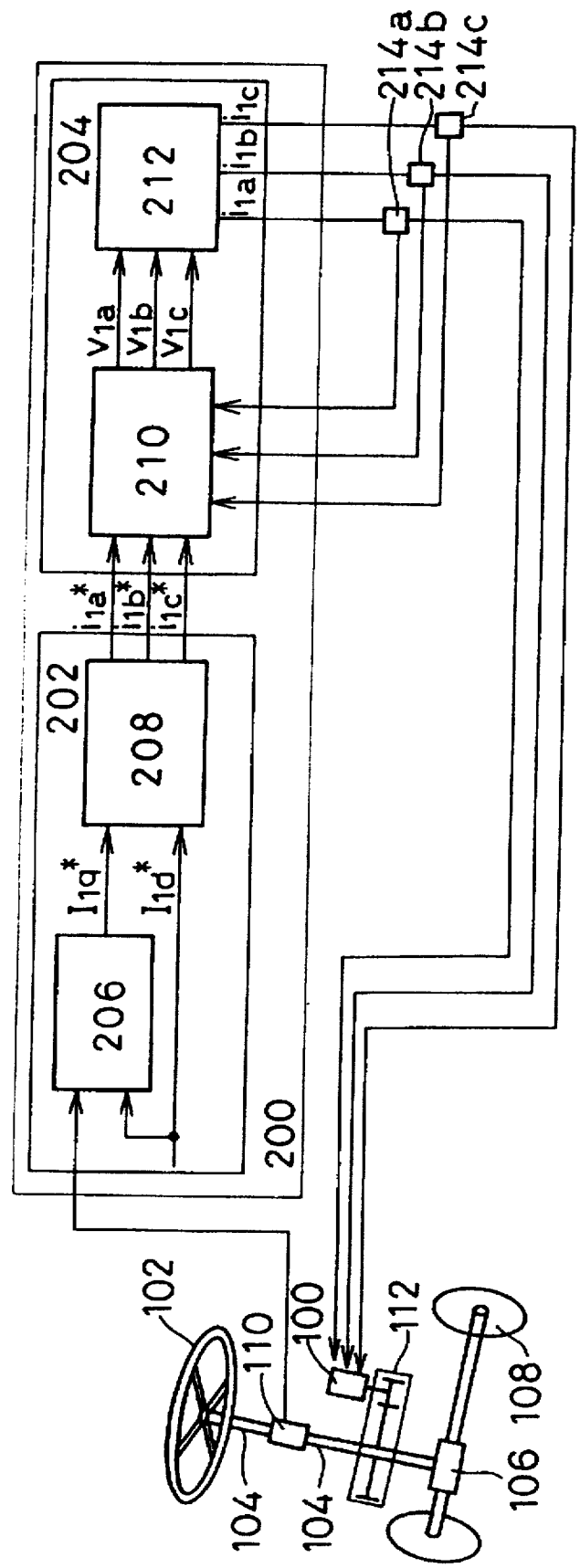
FIG. 2 is a block diagram showing the entire structure of an electric power steering apparatus according to a second embodiment of the present invention.

FIG. 2 is a block diagram showing the entire structure of an electric power steering apparatus according to a second embodiment of the present invention.

In FIG. 2, an induction motor is indicated at 100, a steering wheel is indicated at 102, a steering shaft is indicated at 104, a steering gear is indicated at 106, a wheel is indicated at 108, a steering force sensor is indicated at 110, a reduction gear is indicated at 112, a control system for a motor is indicated at 200, a current commander is indicated at 202, a current controller is indicated at 204, a torque current commander is indicated at 206, a three-phase AC converter is indicated at 208, a voltage commander is indicated at 210, a PWM (pulse width modulation) inverter is indicated at 212, and an electric detector is indicated at 214a, 214b and 214c.

The operation of the electric power steering device having such a structure will be described with reference to FIG. 2.

The steering apparatus is the same as that of the first embodiment. When the induction motor 100 connected to the steering shaft 104 through the reduction gear 112 is driven, an auxiliary steering force is generated. The operation of the control system for a motor 200 for controlling the induction motor 100 in correspondence to the output of the steering force sensor 110 attached to the steering shaft 104 will be described in the present embodiment.

First of all, the operation of the current commander 202 will be described. In most cases, a three-phase induction motor is used. The three-phase induction motor can be regarded as a two-phase induction motor by three-/two-phase conversion. A torque τ generated by the two-phase induction motor is expressed in equation 3:

$$\tau = p \cdot M(i_{1q} \cdot i_{2d} - i_{1d} \cdot i_{2q}) \quad (3)$$
$$= \frac{p \cdot M^2 \cdot I_{1d} \cdot I_{1q}}{L_2}$$

wherein $i_{1d}$ and $i_{1q}$ are stator d- and q-shaft currents, $i_{2d}$ and $i_{2q}$ are rotor d- and q-shaft currents, $L_2$ is a rotor self-inductance, M is a mutual inductance, and p is the number of pole pairs. $I_{1d}$ and $I_{1q}$ are exciting and torque currents which are DC currents. The relationship between $i_{1d}$, $i_{1q}$ and $I_{1d}$, $I_{1q}$ is expressed in equation 4:

$$\begin{bmatrix} i_{1d} \\ i_{1q} \end{bmatrix} = \begin{bmatrix} \cos\theta_0 & -\sin\theta_0 \\ \sin\theta_0 & \cos\theta_0 \end{bmatrix} \begin{bmatrix} I_{1d} \\ I_{1q} \end{bmatrix} \quad (4)$$

wherein $\theta_0$ is an electric phase angle.

It is assumed that a necessary auxiliary steering force command τ* is inputted from the steering sensor by steering. In this case, it is enough that the induction motor gives the auxiliary steering force to the steering shaft. Accordingly, the torque current commander 206 outputs the torque current command value $I_{1q}*$ given by equation 5.

$$I_{1q}' = \frac{L_2 \cdot \tau'}{p \cdot M^2 \cdot I_{1d} \cdot R} \quad (5)$$

The operation of the three-phase AC converter 208 will be described. The slip speed $\omega_s$ is calculated by means of the exciting current command value $I_{1d}*$ and the torque current command value $I_{1q}*$ according to equation 6, $$\omega_s = \frac{1}{T_2} \frac{I_{1q}'}{I_{1d}'} \left( T_2 = \frac{L_2}{R_2} \right) \quad (6)$$

wherein $R_2$ is a stator phase resistance. When the rotational speed of the induction motor is low, the slip speed $\omega_s$ is integrated to approximate to the electric phase angle $\theta_0$. In the case of strict control, the rotational speed $\omega_m$ of the induction motor is measured or estimated. The rotational speed $\omega_m$ thus obtained is added to the slip speed $\omega_s$, and the sum is integrated to obtain the electric phase angle $\theta_0$. Accordingly, the exciting current command value $I_{1d}*$ and the torque current command value $I_{1q}*$ are converted into two-phase stator current command values $i_{1d}*$ and $i_1*$ having a phase difference of 90° according to equation 7, in a similar manner to equation 4.

$$\begin{bmatrix} i_{1d}' \\ i_{1q}' \end{bmatrix} = \begin{bmatrix} \cos\theta_0 & -\sin\theta_0 \\ \sin\theta_0 & \cos\theta_0 \end{bmatrix} \begin{bmatrix} I_{1d}' \\ I_{1q}' \end{bmatrix} \quad (4)$$

The two-phase stator current command values $i_{1d}*$ and $i_1*$ are converted into three-phase stator current command values $i_{1a}*$, $i_{1b}*$ and $i_{1c}*$ according to equation 8.

$$\begin{bmatrix} i_{1a}' \\ i_{1b}' \\ i_{1c}' \end{bmatrix} = \sqrt{\frac{2}{3}} \begin{bmatrix} 1 & 0 \\ -\frac{1}{2} & \frac{\sqrt{3}}{2} \\ -\frac{1}{2} & -\frac{\sqrt{3}}{2} \end{bmatrix} \begin{bmatrix} i_{1d}' \\ i_{1q}' \end{bmatrix} \quad (8)$$

The operation of the current controller 204 will be described. Current feedback control is performed in such a manner that actual stator currents $i_{1a}$, $i_{1b}$ and $i_{1c}$ follow stator current command values $i_{1a}*$, $i_{1b}*$ and $i_{1c}*$ respectively. For example, the actual stator alternating current is detected by the current detectors 214a, 214b and 214c, and a voltage command value $v_{1z}$ (z=a, b, c) obtained according to equation 9 is output from the voltage commander 210.

$$v_{1z} = k_1 \int_0^t (i_{1z}' - i_{1z})dt - k_p \cdot i_{1z} \, (z = a,b,c) \quad (9)$$

$k_f = [k_i \ k_p]^T$: feedback gain

The PWM inverter 212 sends, to the induction motor 100, a signal having a pulse width corresponding to the voltage command value which is a control signal sent from the voltage commander 210, so as to make a current flow. If three-phase stator alternating currents $i_{1a}$, $i_{1b}$ and $i_{1c}$ sent to the induction motor 100 are added, a value of 0 is obtained as in equation 10.

$$i_{1a} + i_{1b} + i_{1c} = 0 \quad (10)$$

It is possible to detect two of three currents and calculate the residual current from the two current values which are detected. Thus, the stator alternating current sent to the induction motor can be controlled to be converted into the desired command value. Using current control, the desired torque can be generated by the induction motor. Consequently, it is possible to implement a response corresponding to a command sent from the steering sensor.

While the rotational speed of the induction motor can be detected by a speed sensor fixed to the induction motor, it may be estimated from a current value and the like sent to the induction motor. In addition, the rotational speed of the induction motor can be obtained from the gear ratio of the reduction gear 112 and the steering angle which is measured.

In the case where the winding of the induction motor is short-circuited between winding terminals or partly short-circuited in the motor, the load impedance of a driving circuit greatly decreases so that excessive current flows. Consequently, an output-stage semiconductor may be broken. In such a case, the control is interrupted so as not to send an output current from the current controller 204. If the current flow to the motor is interrupted, the induction motor does not generate braking force and is in a free condition even though the winding is short-circuited. For this reason, the auxiliary steering force is not generated but steering can still be performed manually. In this respect, the induction motor is different from a motor having a permanent magnet. In the case where a direct current flows for some reason, for example, the output-stage semiconductor of the current controller 204 being short-circuited, a great braking force is generated so safety problems exist.

A third embodiment of the present invention provides an electric power steering apparatus capable of stopping the current flow to an induction motor when a direct current is sent to the induction motor.

The electric power steering apparatus according to the third embodiment of the present invention will be described with reference to the drawings.

Figure 3:
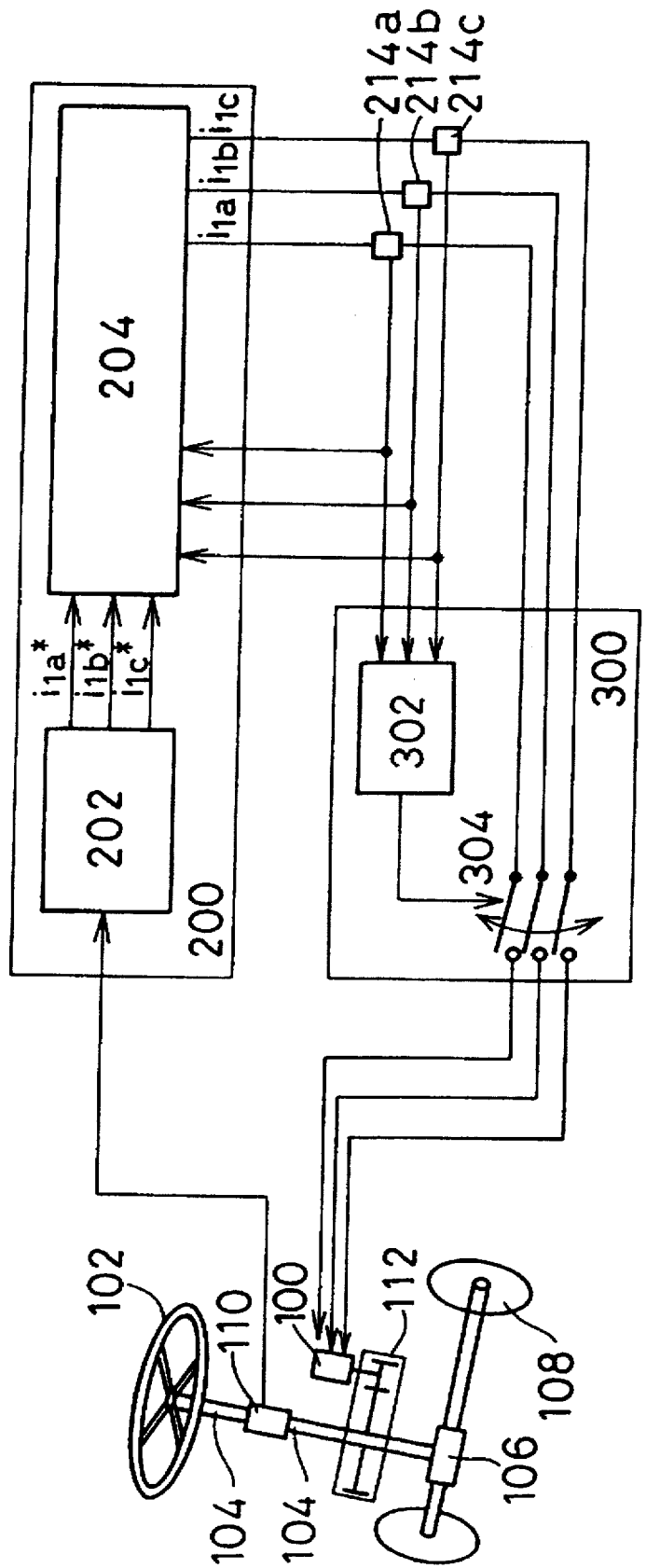
FIG. 3 is a block diagram showing the entire structure of an electric power steering apparatus according to a third embodiment of the present invention.

FIG. 3 shows the entire structure of the electric power steering apparatus according to the third embodiment of the present invention.

In FIG. 3, an induction motor is indicated at 100, a steering wheel is indicated at 102, a steering shaft is indicated at 104, a steering gear is indicated at 106, a wheel is indicated at 108, a steering force sensor is indicated at 110, a reduction gear is indicated at 112, a control system for a motor is indicated at 200, a current commander is indicated at 202, a current controller is indicated at 204, a current detector is indicated at 214a, 214b and 214c, stop means for malfunction is indicated at 300, a malfunction detector is indicated at 302, and a switch is indicated at 304.

The operation of the power steering apparatus and the control system 200 is the same as in the second embodiment. According to the present embodiment, the stop means for malfunction 300 is provided. The operation of the stop means for malfunction 300 will be described.

The malfunction detector 302 checks currents output from respective current detectors and measures the time over which they have the same polarity, i.e., the time necessary for the polarity to change from positive to negative or from negative to positive. If the time over which the polarity of at least one current does not change is greater than a predetermined constant value, it is decided that DC components are flowing due to some failure so that braking occurs. The switch 304 is turned off so as to stop the braking operation. Consequently, even though the DC components may flow for some reason, the current flow to the induction motor is interrupted so that steering can be maintained.

In general, steering is controlled to be harder for safety reasons when running on the highway. For this purpose, a direct current flows to perform dynamic braking. In the case where a DC command is given, the malfunction detector 302 compares the time in which the polarity of the actual current value output from the current detector is not changed with the time in which the polarity of a corresponding current command value output from the current commander 202 is not changed. If the time in which the polarity of the actual current value is not changed is longer than the time in which the polarity of the current command value is not changed by a predetermined constant value or more, the switch 304 is turned off.

While a switch for cutting off a current is provided following the control system 200 in the present embodiment, it may be provided in a part of the control system in which a stator current command value is given or following the voltage commander.

The electric power steering apparatus has been described in the above-mentioned embodiment. Also in the case where the induction motor of the electric power steering apparatus is controlled, the information for the rotational speed of the induction motor is necessary. However, if a speed sensor for measuring the rotational speed of the induction motor is used, the size of the unit is increased and costs become higher. A control system for an induction motor having no speed sensor will be described in the following embodiment.

The control system for an induction motor according to an embodiment of the present invention will be described with reference to the drawings.

Figure 4:
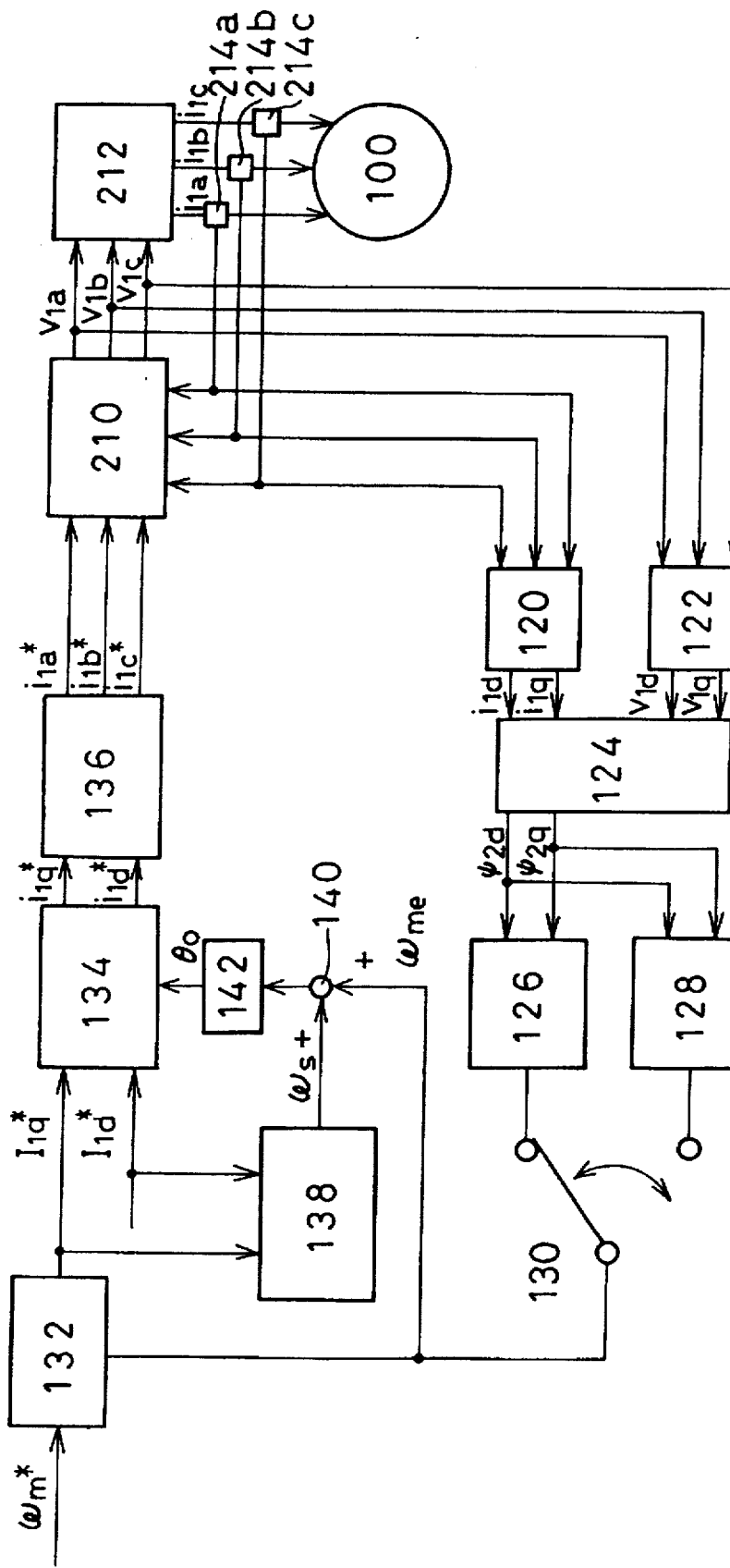
FIG. 4 is a block diagram showing the entire structure of a control system for an induction motor according to a fourth embodiment of the present invention.

FIG. 4 shows the entire structure of a control system for an induction motor according to a fourth embodiment of the present invention.

In FIG. 4, an induction motor is indicated at 100, two-/three-phase converters are indicated at 120 and 122, a rotor flux estimator is indicated at 124, a speed estimator A is indicated at 126, a speed estimator B is indicated at 128, an estimated speed switch is indicated at 130, a speed controller is indicated at 132, a rotary/static coordinate converter is indicated at 134, a two-/three-phase converter is indicated at 136, a slip frequency computing unit is indicated at 138, an adder is indicated at 140, an integrator is indicated at 142, a voltage commander is indicated at 210, a PWM inverter is indicated at 212, and current detectors are indicated at 214a, 214b and 214c.

Figure 5:
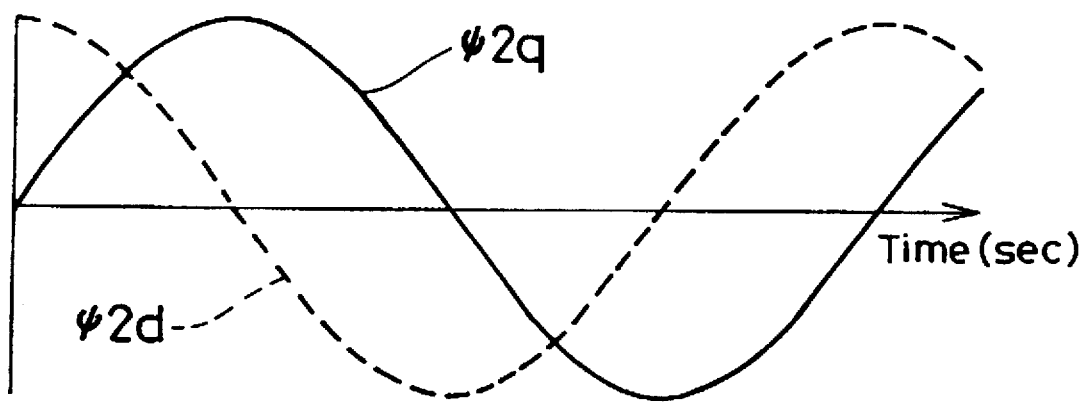
FIG. 5 is a conceptional diagram showing the change in rotor flux with time of an induction motor.

FIG. 5 is a conceptional diagram showing the change in rotor flux with time of the induction motor.

Figure 6:
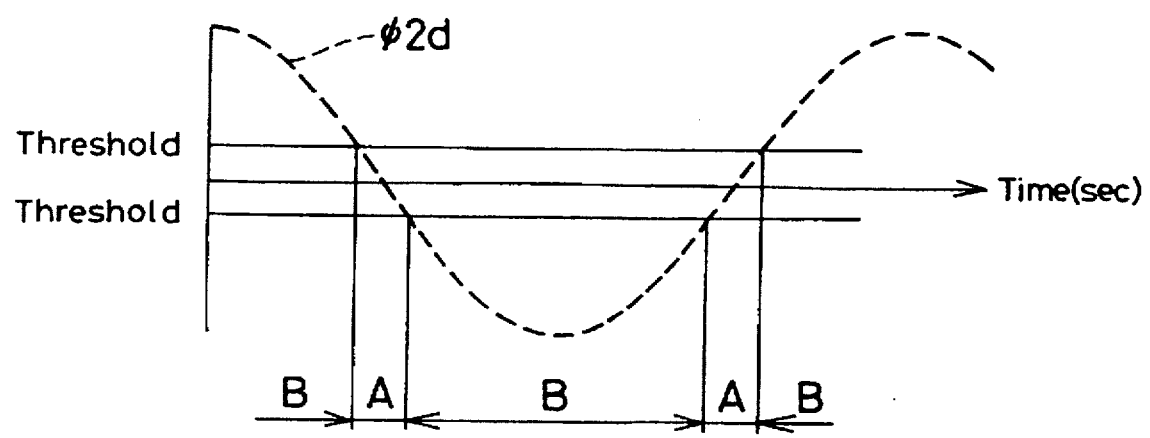
FIG. 6 is a conceptional diagram showing a method for switching a speed estimator according to the fourth embodiment of the present invention.

FIG. 6 is a conceptional diagram showing a method for switching the speed estimator according to the fourth embodiment of the present invention.

Figure 7:
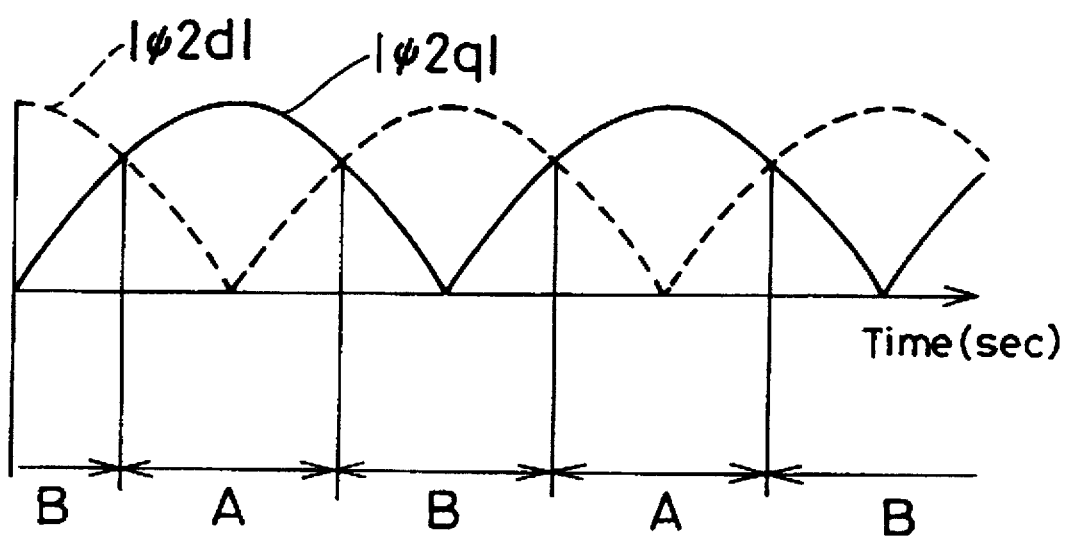
FIG. 7 is a conceptional diagram showing another method for switching a speed estimator according to the fourth embodiment of the present invention.

FIG. 7 is a conceptional diagram showing another method for switching the speed estimator according to the fourth embodiment of the present invention.

The speed control of the control system for a motor having such a structure will be described with reference to FIGS. 4, 5 and 6.

In the same manner as the control system for an induction motor according to the prior art and the second embodiment, a signal having a pulse width corresponding to a voltage command value, which is a control signal sent from the voltage commander 210, is sent from the PWM inverter 212 to the induction motor 100. In this case, three-phase stator alternating currents $i_{1a}$, $i_{1b}$ and $i_{1c}$ sent to the induction motor 100 are detected by the current detectors 214a, 214b and 214c.

The speed controller 132 calculates a torque current command value $I_{1q}{}^*$ from a rotational speed command value $\omega_m{}^*$ and a rotational speed estimated value $\omega_{me}$ of the induction motor according to equation 11.

$$I_{1q}{}^* = k_{s1} \int_0^t (\omega_m{}^* - \omega_{me})dt - k_{sP} \cdot \omega_{me} \tag{11}$$

$k_{sf} = [k_{sI}\ k_{sP}]^T$: feedback gain

In the case of control according to equation 11, if the precision in estimating the rotational speed value is high, it is possible to make the rotational speed of the induction motor follow the rotational speed command value so that speed control can optionally be performed. The slip frequency computing unit 138 calculates a slip speed $\omega_s$, using equation 12, from an exciting current command value $I_{1d}^*$ and a torque current command value $I_{1q}^*$ which are predetermined constant values.

$$\omega_s = \frac{1}{T_2} \frac{i_{1q}'}{i_{1d}'} \left( T_2 = \frac{L_2}{R_2} \right) \quad (12)$$

The slip speed $\omega_s$ and the rotational speed estimated value $\omega_{me}$ are added by the adder 140. Then, a value thus obtained is integrated by the integrator 142, so that an electric phase angle $\theta_0$ is obtained. Two-phase stator current command values having a phase difference of 90° are obtained from equation 13 using the exciting current command value $I_{1d}^*$, the torque current command value $I_{1q}^*$ and the electric phase angle $\theta_0$ by means of the rotary/static coordinate converter 134.

$$\begin{bmatrix} i_{1d}' \\ i_{1q}' \end{bmatrix} = \begin{bmatrix} \cos\theta_0 & -\sin\theta_0 \\ \sin\theta_0 & \cos\theta_0 \end{bmatrix} \begin{bmatrix} i_{1d}' \\ i_{1q}' \end{bmatrix} \quad (13)$$

The two-phase stator current command values are then converted into three-phase stator current command values $i_{1a}^*$, $i_{1b}^*$ and $i_{1c}^*$ using equation 14 by means of the two-/three-phase converter 136.

$$\begin{bmatrix} i_{1a}' \\ i_{1b}' \\ i_{1c}' \end{bmatrix} = \sqrt{\frac{2}{3}} \begin{bmatrix} 1 & 0 \\ -\frac{1}{2} & \frac{\sqrt{3}}{2} \\ -\frac{1}{2} & -\frac{\sqrt{3}}{2} \end{bmatrix} \begin{bmatrix} i_{1d}' \\ i_{1q}' \end{bmatrix} \quad (14)$$

Further, current feedback control is performed by the voltage commander 210 in such a manner that the actual stator alternating current follows the stator current command value. For example, a voltage command value $v_{1z}$ ($z$=a, b, c) obtained using equation 15 is output from the current detectors 214a, 214b and 214c. Consequently, the stator alternating current sent to the induction motor can be controlled to have the desired command value.

$$v_{1z} = k_1 \int_0^t (i_{1z}' - i_{1z}) dt - k_p \cdot i_{1z} \ (z = a,b,c) \quad (15)$$

$k_f = [k_1 \ k_p]^T$ : feedback gain

As described above, the control system for an induction motor has the same structure as a vector controller having a speed sensor according to the prior art. A structure in which the rotary speed of the induction motor is estimated will be described below.

The three-/two-phase converter 120 converts the outputs of the current detectors 214a, 214b and 214c into two-phase alternating currents $i_{1d}$ and $i_{1q}$ according to equation 16.

$$\begin{bmatrix} i_{1d} \\ i_{1q} \end{bmatrix} = \sqrt{\frac{2}{3}} \begin{bmatrix} 1 & -\frac{1}{2} & -\frac{1}{2} \\ 0 & \frac{\sqrt{3}}{2} & -\frac{\sqrt{3}}{2} \end{bmatrix} \begin{bmatrix} i_{1a} \\ i_{1b} \\ i_{1c} \end{bmatrix} \quad (16)$$

The three-/two-phase converter 122 converts three-phase voltage command values $v_{1z}$ ($z$=a, b, c) into two-phase AC voltages $v_{1d}$ and $v_{1q}$ according to equation 17.

$$\begin{bmatrix} v_{1d} \\ v_{1q} \end{bmatrix} = \sqrt{\frac{2}{3}} \begin{bmatrix} 1 & -\frac{1}{2} & -\frac{1}{2} \\ 0 & \frac{\sqrt{3}}{2} & -\frac{\sqrt{3}}{2} \end{bmatrix} \begin{bmatrix} v_{1a} \\ v_{1b} \\ v_{1c} \end{bmatrix} \quad (17)$$

Rotor fluxes $\phi_{2d}$ and $\phi_{2q}$ can be estimated from the two-phase alternating currents and the two-phase AC voltages by means of the rotor flux estimator 124 according to equations 18 and 19.

$$\phi_{2d} = \frac{L_2}{M} \int_0^t (v_{1d} - R_1 \cdot i_{1d}) dt - \frac{L_1 L_2 - M^2}{M} i_{1d} \quad (18)$$

$$\phi_{2q} = \frac{L_2}{M} \int_0^t (v_{1q} - R_1 \cdot i_{1q}) dt - \frac{L_1 L_2 - M^2}{M} i_{1q} \quad (19)$$

In the same manner as the prior art, two equations for estimating the rotational speed $\omega_{me}$ of the induction motor can be obtained from the basic equation (13) of the induction motor which is a two-phase model.

$$\omega_{me} = \frac{1}{\phi_{2q}} \left( \frac{R_2}{L_2} M \cdot i_{1d} - \frac{R_2}{L_2} \phi_{2d} - \frac{d}{dt} \phi_{2d} \right) \quad (20)$$

$$\omega_{me} = \frac{1}{\phi_{2d}} \left( -\frac{R_2}{L_2} M \cdot i_{1q} + \frac{R_2}{L_2} \phi_{2q} + \frac{d}{dt} \phi_{2q} \right) \quad (21)$$

According to equations 20 and 21, a denominator may have a value of 0 in a similar manner to the prior art. In this case, the precision in estimating the rotational speed is poor in the vicinity of 0. In the case where the induction motor has no current flow, i.e., the induction motor stops or a speed is not controlled, the rotor flux $\phi_{2q}$ which is a denominator of equation 20 and the rotor flux $\phi_{2d}$ which is a denominator of equation 21 have a value of 0. When the induction motor is driven, the rotor flux shown in FIG. 5 is obtained. The speed estimator A 126 calculates an estimated speed numerator portion A which is a numerator based on equation 20. A value thus obtained is divided by the rotor flux $\phi_{2q}$ which is a denominator so as to estimate the rotational speed of the induction motor. The speed estimator B 128 calculates an estimated speed numerator portion B which is a numerator based on equation 21. A value thus obtained is divided by the rotor flux $\phi_{2d}$ which is a denominator so as to estimate the rotational speed of the induction motor. The estimated speed switch 130 checks the size of the rotor fluxes $\phi_{2d}$ and $\phi_{2q}$. If one of them is not in the vicinity of 0 and is selected, the rotational speed of the induction motor can always be estimated with high precision.

As shown in FIG. 6, when the absolute value of the rotor flux $\phi_{2d}$ is smaller than a threshold value, the rotational speed of the induction motor can be determined by switching to the output of the speed estimator A. When the absolute value of the rotor flux $\phi_{2d}$ is greater than a threshold value, the rotational speed of the induction motor can be determined by switching to the output of the speed estimator B.

The two-/three-phase converter 136 calculates the three-phase stator current command value and compares the same with the three-phase stator alternating current. The voltage commander 210 controls the three-phase stator alternating currents. The three-phase stator alternating currents detected by the current detectors 214a to 214c are converted into the two-phase stator alternating currents by the three-/two-phase converter 120. The two-phase current is compared with the two-phase stator current command value which has not entered the two-/three-phase converter 136 so that current control is performed. Then, the two-phase voltage command value is converted into the three-phase voltage command value by the two-/three-phase converter 136.

In place of the actual voltage, the voltage command value is used. Consequently, a voltage detector for detecting a voltage is not required.

According to the present embodiment, it is decided whether the rotor flux is in the vicinity of 0 or not when the estimated speed switch switches the speed estimator. In order to decide whether the rotor flux is actually in the vicinity of 0 or not, a suitable threshold should be introduced. However, there is a probability that the threshold should be varied according to the target, i.e., the rotational speed command value. If the rotational speed command value is greatly varied, it is not easy to alter the threshold according to the command value.

To solve the above-mentioned problem, the absolute values of the rotor fluxes $\phi_{2d}$ and $\phi_{2q}$ which are output from the rotor flux estimator 124 are compared. It is checked which one is greater than the other. As shown in FIG. 7, the speed estimator A 126 is selected and executed for the conditions shown in equation 22.

$$|\phi_{2d}| < |\phi_{2q}| \tag{22}$$

The speed estimator B 128 is selected for the condition shown in equation 23 and executed so as to avoid division by 0 during speed estimation. Consequently, it is possible to easily implement the rotational speed estimation with high precision.

$$|\phi_{2d}| \geq |\phi_{2q}| \tag{23}$$

While the speed estimator is switched according to the absolute value of the rotor flux in the embodiment described above, the speed estimator also can be switched according to the electric phase angle of the stator alternating current. In other words, the rotor flux has the following relationship shown in equations 24 and 25.

$$\phi_{2d} = M \cdot I_{1d} \cos(\theta_0) \tag{24}$$

$$\phi_{2q} = M \cdot I_{1d} \sin(\theta_0) \tag{25}$$

Accordingly, the output of the integrator 142 is checked. If the condition of equation 26 holds, the speed estimator A 126 is selected and executed.

$$(\tfrac{1}{4}+2n)\pi \leq \theta_0 < (\tfrac{3}{4}+2n)\pi, (\tfrac{3}{4}+2n)\pi \leq \theta_0 < (\tfrac{7}{4}+2n)\pi \tag{26}$$

(n: integer)

If the condition of equation 27 holds, the speed estimator B 128 is selected and executed so as to avoid division by 0 during speed estimation.

$$2n\pi \leq \theta_0 < (1/4 + 2n)\pi \tag{27}$$
$$(3/4 + 2n)\pi \leq \theta_0 < (5/4 + 2n)\pi$$
$$(7/4 + 2n)\pi \leq \theta_0 < 2(n + 1)\pi$$
(n: integer)

As described above, the rotor fluxes $\phi_{2d}$ and $\phi_{2q}$ are 0 in the state where the induction motor is stopped. Therefore, it is possible to add the function of deciding that the induction motor is stopped, i.e., the rotational speed is 0 when the absolute values of the rotor fluxes $\phi_{2d}$ and $\phi_{2q}$ are very small at the time of starting. Consequently, also in the case where the induction motor is being started, an error signal is not sent from the speed estimator so that stable speed control can be achieved.

The output torque of the induction motor can be controlled in the fourth embodiment, since the rotational speed of the induction motor is estimated to control the speed of the induction motor by using the estimated speed.

A control system for an induction motor for performing torque control according to an embodiment of the present invention will be described with reference to the drawings.

Figure 8:
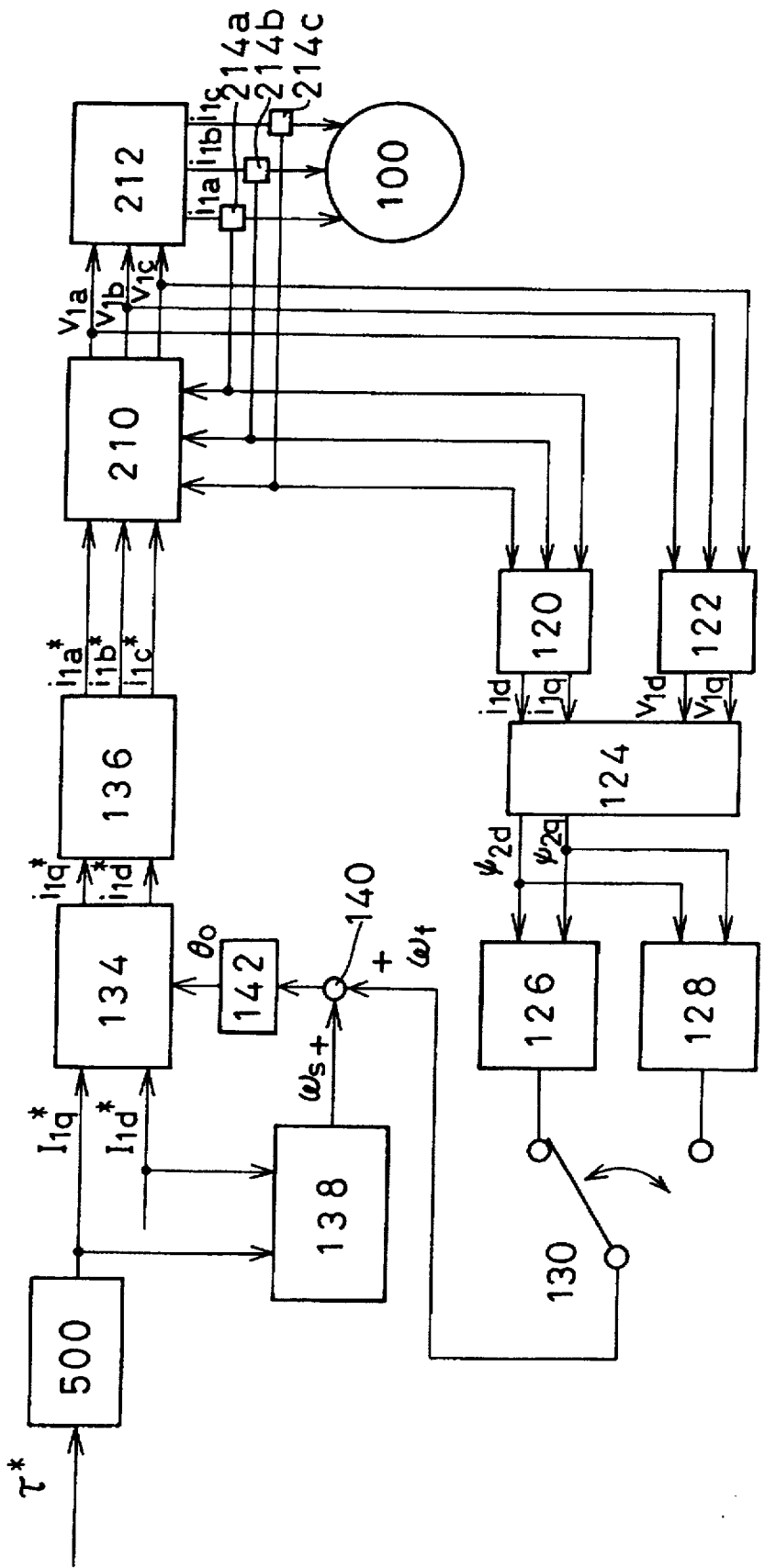
FIG. 8 is a block diagram showing the entire structure of a control system for an induction motor according to a fifth embodiment of the present invention.

FIG. 8 shows the entire structure of a control system for an induction motor according to a fifth embodiment of the present invention.

In FIG. 8, an induction motor is indicated at 100, three-/two-phase converters are indicated at 120 and 122, a rotor flux estimator is indicated at 124, a speed estimator A is indicated at 126, a speed estimator B is indicated at 128, an estimated speed switch is indicated at 130, a rotary/static coordinate converter is indicated at 134, a two-/three-phase converter is indicated at 136, a slip frequency computing unit is indicated at 138, an adder is indicated at 140, an integrator is indicated at 142, a voltage commander is indicated at 210, a PWM inverter is indicated at 212, current detectors are indicated at 214a, 214b and 214c, and a torque current command generator is indicated at 500.

The operation of the control system having such a structure will be described with reference to FIG. 8.

In the same manner as the control system for an induction motor according to the fourth embodiment, the operation of the rotary/static coordinate converter 134, two-/three-phase converter 136, slip frequency computing unit 138, and voltage commander 210 is the same as a vector controller having a speed sensor according to the prior art. The operation of the three-/two-phase converters 120 and 122, rotor flux estimator 124, speed estimator A 126, speed estimator B 128, an estimator speed switch 130 which are used for estimating speed of the induction motor, is the same as in the fourth embodiment.

In the case where torque control is performed, the output torque of the induction motor is expressed by equation 3, according to which the torque current command generator 500 outputs a torque current command value $I_{1q}^*$ obtained from the given torque command $\tau^*$ and a predetermined constant exciting current command value $I_{1d}^*$ based on equation 28.

$$I_{1q}^* = \frac{L_2 \cdot \tau^*}{p \cdot M^2 \cdot I_{1d}^*} \tag{28}$$

A stator current command value is generated by the torque current command value $I_{1q}^*$, the exciting current command value $I_{1d}^*$ and an estimated speed in the same manner as in the fourth embodiment. When a current is controlled according to the current command, the torque corresponding to the command can be output.

In the fifth embodiment, it is necessary to estimate the speed of the induction motor even though torque control is performed.

A method for performing torque control without using the speed of the induction motor will be described as a sixth embodiment of the present invention.

Figure 9:
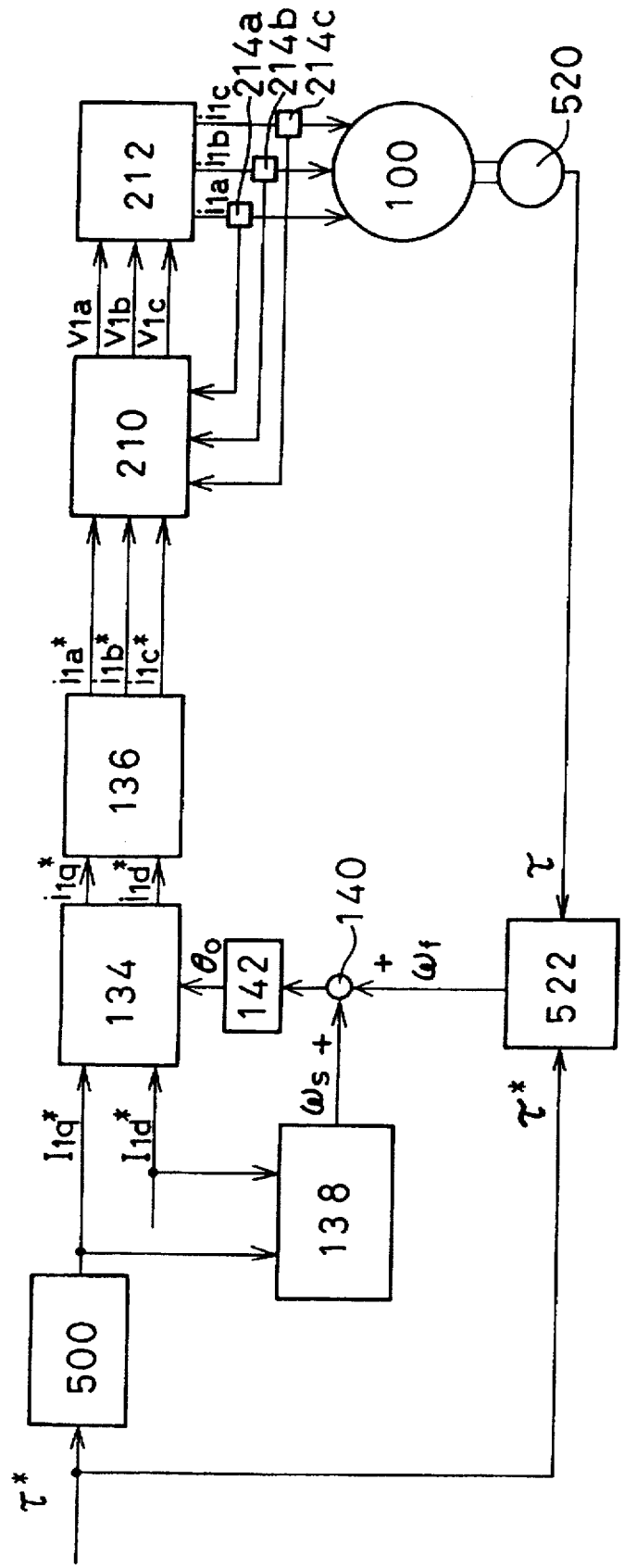
FIG. 9 is a block diagram showing the entire structure of a control system for an induction motor according to a sixth embodiment of the present invention.

FIG. 9 shows the entire structure of a control system for an induction motor according to the sixth embodiment of the present invention.

In FIG. 9, an induction motor is indicated at 100, a rotary/static coordinate converter is indicated at 134, a two-/three-phase converter is indicated at 136, a slip frequency computing unit is indicated at 138, an adder is indicated at 140, an integrator is indicated at 142, a voltage commander is indicated at 210, a PWM inverter is indicated at 212, current detectors are indicated at 214a, 214b and 214c, a torque current command generator is indicated at 500, a torque detector is indicated at 520, and a torque controller is indicated at 522.

The operation of the control system having such a structure will be described with reference to FIG. 9.

In the same manner as the control system according to the fourth embodiment, the operation of the rotary/static coordinate converter 134, two-/three-phase converter 136, slip frequency computing unit 138, and voltage commander 210 is the same as a vector controller having a speed sensor according to the prior art. The operation of the torque current commander 500 is the same as in the fifth embodiment.

Without the rotational speed information of the induction motor, the output torque is controlled as follows. The torque controller 522 performs control with an output torque τ detected by the torque detector 520 and a torque command τ* according to equation 29 so that the output torque is converted into the command torque:

$$\omega_f = k_1 \int_0^t (\tau^* - \tau) dt - k_p \cdot \tau \tag{29}$$

wherein $\omega_f$ is a correction angle speed derived from a comparison of the output torque with the command torque and is used to change a frequency. $k_I$ and $k_p$ are feedback gains.

The correction angle speed $\omega_f$ and the slip angle speed $\omega_s$ are added by the adder 140. A value thus obtained is integrated by the integrator 142. Thus, an electric phase angle $\theta_0$ is obtained.

In the same manner as the fourth embodiment, the rotary/static coordinate converter 134 and the two-/three-phase converter 136 calculate three-phase stator current command values $i_{1a}^*$, $i_{1b}^*$ and $i_{1c}^*$ from the exciting current command value $I_{1d}^*$, the torque current command value $I_{1q}^*$ and the electric phase angle $\theta_0$.

More specifically, the amplitude A of three-phase stator current command values $i_{1a}^*$, $i_{1b}^*$ and $i_{1c}^*$ can be determined by the torque command τ* and the exciting current command value $I_{1d}^*$ according to equation 30.

$$A = \sqrt{\frac{2}{3}} \sqrt{(I_{1d})^2 + (I_{1q})^2} \tag{30}$$

$$= \sqrt{\frac{2}{3}} \sqrt{(I_{1d}^*)^2 + \left(\frac{L_2 \cdot \tau^*}{3 \cdot p \cdot M^2 \cdot I_{1d}^*}\right)^2}$$

In addition, a frequency is determined by the electric phase angle $\theta_0$. Therefore, the amplitude A of three-phase state current command values $i_{1a}^*$, $i_{1b}^*$ and $i_{1c}^*$ can be determined by the torque τ, the auxiliary steering force command τ* and the exciting current command value $I_{1d}^*$/

Further, current feedback control is performed by the voltage commander 210 in such a manner that the actual alternating current follows the stator current command value in the same manner as the fourth embodiment.

By applying torque feedback control and current feedback control, it is possible to generate the desired torque of the induction motor without using the rotational speed detector of the induction motor.

Also, in the case where the torque detector is removed and the output torque information is not used, i.e., only the slip angle speed $\omega_s$ is integrated to control the electric phase angle $\theta_0$, the output torque can be controlled to become the desired command torque when the rotational speed of the induction motor is almost 0. In the case where the rotational speed of the induction motor is not 0, the output torque is decreased when the rotational speed is increased. When the speed obtained by dividing the slip angle speed $\omega_s$ by the number of pole pairs p is reached, the output torque becomes 0. For this reason, the output torque is checked and corrected by the correction angle speed $\omega_f$ in equation 29. Consequently, torque control also can be performed in the case where the induction motor is rotating.

While the torque feedback control is expressed by equation 29, other control methods can be used.

While the rotational speed detector of the induction motor is not required in the sixth embodiment, a torque detector is used for detecting the output torque of the induction motor. Consequently, the method according to the sixth embodiment is not as advantageous with respect to the cost and size.

A seventh embodiment of the present invention provides a control system for an induction motor which does not require the torque detector.

Figure 10:
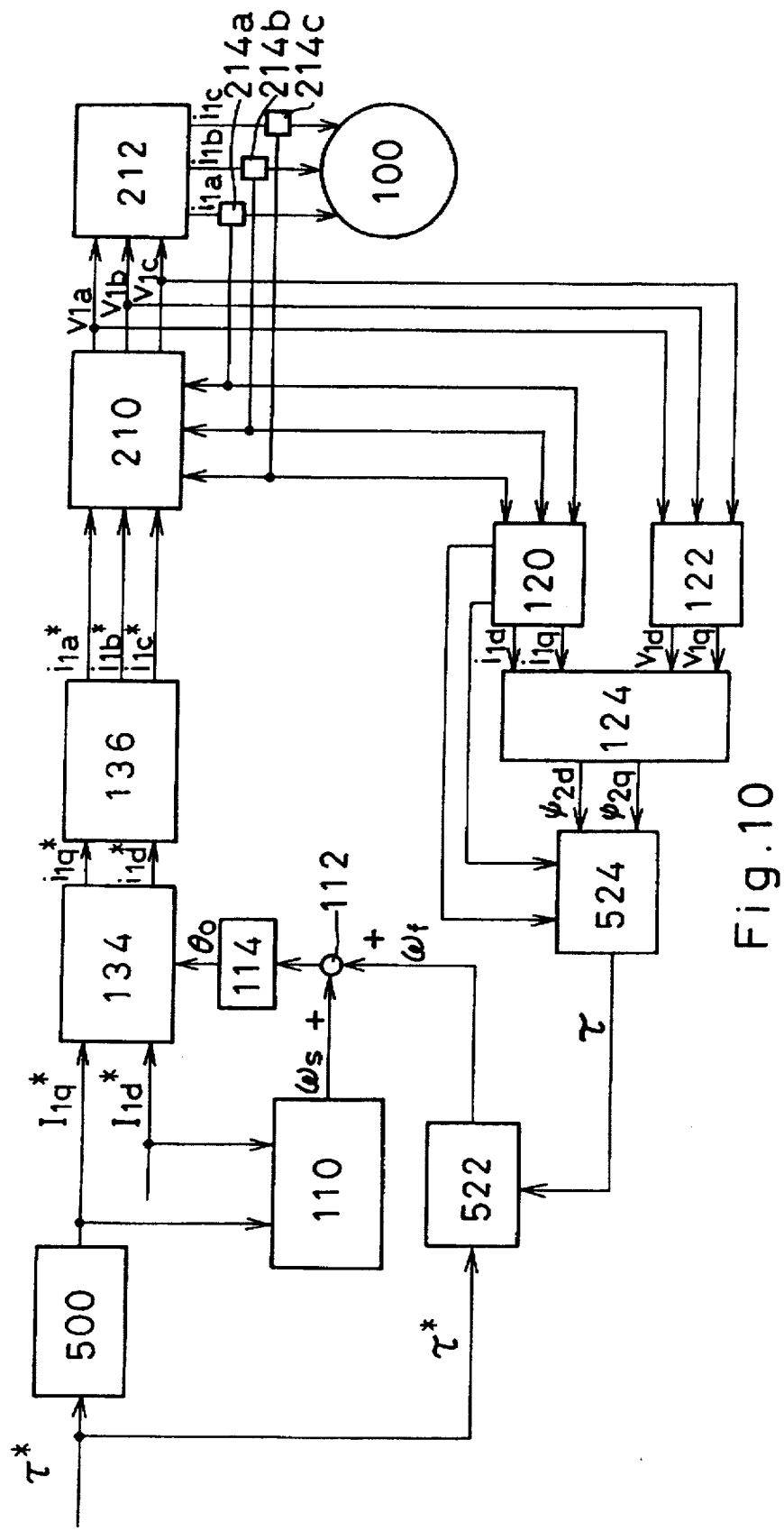
FIG. 10 is a block diagram showing the entire structure of a control system for an induction motor according to a seventh embodiment of the present invention.

FIG. 10 shows the entire structure of a control system for an induction motor according to the seventh embodiment of the present invention.

In FIG. 10, an induction motor is indicated at 100, three-/two-phase converters for converting a three-phase alternating current into a two-phase alternating current and vice versa are indicated at 120 and 122, a rotor flux estimator is indicated at 124, a rotary/static coordinate converter is indicated at 134, a two-/three-phase converter is indicated at 136, a slip frequency computing unit is indicated at 110, an adder is indicated at 112, an integrator is indicated at 114, a voltage commander is indicated at 210, a PWM inverter is indicated at 212, current detectors are indicated at 214a, 214b and 214c, a torque current command generator is indicated at 500, a torque controller is indicated at 522, and a torque estimator is indicated at 524.

The operation of the control system having such a structure will be described with reference to FIG. 10.

The operation of the PWM inverter 212, torque current command generator 500, rotary/static coordinate converter 134, two-/three-phase converter 136, slip frequency computing unit 110, voltage commander 210, and torque controller 522 is the same as in the sixth embodiment. A structure in which the output torque of the induction motor is estimated from the measured current value and the like will be described in the present embodiment.

The three-/two-phase converter 120 converts the outputs of the current detectors 214a, 214b and 214c into two-phase alternating currents $i_{1d}$ and $i_{1q}$ according to equation 31.

$$\begin{bmatrix} i_{1d} \\ i_{1q} \end{bmatrix} = \sqrt{\frac{2}{3}} \begin{bmatrix} 1 & -\frac{1}{2} & -\frac{1}{2} \\ 0 & \frac{\sqrt{3}}{2} & -\frac{\sqrt{3}}{2} \end{bmatrix} \begin{bmatrix} i_{1a} \\ i_{1b} \\ i_{1c} \end{bmatrix} \tag{31}$$

The three-/two-phase converter 122 converts three-phase command values $v_{1z}$ (z=a, b, c) into two-phase AC voltages $v_{1d}$ and $v_{1q}$ according to equation 32.

$$\begin{bmatrix} v_{1d} \\ v_{1q} \end{bmatrix} = \sqrt{\frac{2}{3}} \begin{bmatrix} 1 & -\frac{1}{2} & -\frac{1}{2} \\ 0 & \frac{\sqrt{3}}{2} & -\frac{\sqrt{3}}{2} \end{bmatrix} \begin{bmatrix} v_{1a} \\ v_{1b} \\ v_{1c} \end{bmatrix} \tag{32}$$

The rotor flux estimator 124 can estimate rotor fluxes $\phi_{2d}$ and $\phi_{2q}$ from the two-phase alternating current and two-phase AC voltage according to equations 33 and 34.

$$\phi_{2d} = \frac{L_2}{M} \int_0^t (v_{1d} - R_1 \cdot i_{1d}) dt - \frac{L_1 L_2 - M^2}{M} i_{1d} \tag{33}$$

$$\phi_{2q} = \frac{L_2}{M} \int_0^t (v_{1q} - R_1 \cdot i_{1q}) dt - \frac{L_1 L_2 - M^2}{M} i_{1q} \tag{34}$$

The operation of the torque estimator 524 will be described. While the output torque of the induction motor is expressed by equation 3, it is varied with the rotor fluxes according to equation 35.

$$\tau = \frac{p \cdot M}{L_2} (i_{1q} \cdot \phi_{2d} - i_{1d} \cdot \phi_{2q}) \tag{35}$$

Accordingly, the torque estimator 524 can estimate the output torque according to equation 35. In the same manner as the sixth embodiment, the torque controller 522 can output a correction angle speed $\omega_r$ by using the estimated torque so that the output torque is changed into the command torque and perform control to obtain the desired torque.

Another configuration as follows is possible. The two-/three-phase converter 136 forms a three-phase stator current command value and compares the same with a three-phase stator alternating current. The voltage commander 210 controls the three-phase stator alternating currents. The following structure can be used. More specifically, the three-phase stator alternating current detected by the current detector is converted into the two-phase stator alternating current by the three-/two-phase converter. The two-phase current is compared with the two-phase stator current command value which has not entered the two-/three-phase converter 136 so as to perform current control. Then, the two-phase voltage command value is converted into the three-phase voltage command value by the two-/three-phase converter.

Another configuration as follows is possible. The voltage command value is used in place of an actual voltage. Consequently, the voltage detector for detecting a voltage is not required. However, when the voltage of a power supply is changed, it is necessary to measure and correct a power supply voltage.

While the torque is estimated by using the rotor flux based on equation 35, a rotor current can be estimated using equation 36 or stator fluxes $\phi_{1d}$ and $\phi_{1q}$ can be estimated using equation 37 in order to obtain the torque.

$$\tau = p \cdot M (i_{1q} \cdot i_{2d} - i_{1d} \cdot i_{2q}) \tag{36}$$

$$\tau = p (i_{1q} \phi_{1d} - i_{1d} \phi_{1q}) \tag{37}$$

The control system for an induction motor having no speed detector of the induction motor and capable of performing the torque control has been described in the fifth, sixth and seventh embodiments. An electric power steering apparatus using the control system will be described below.

An eighth embodiment of the present invention provides an electric power steering apparatus wherein a control system for an induction motor which does not require a speed detector is used and additional equipment such as a clutch for emergency or the speed detector is not required so that the desired auxiliary steering force can be given to a steering system.

Figure 11:
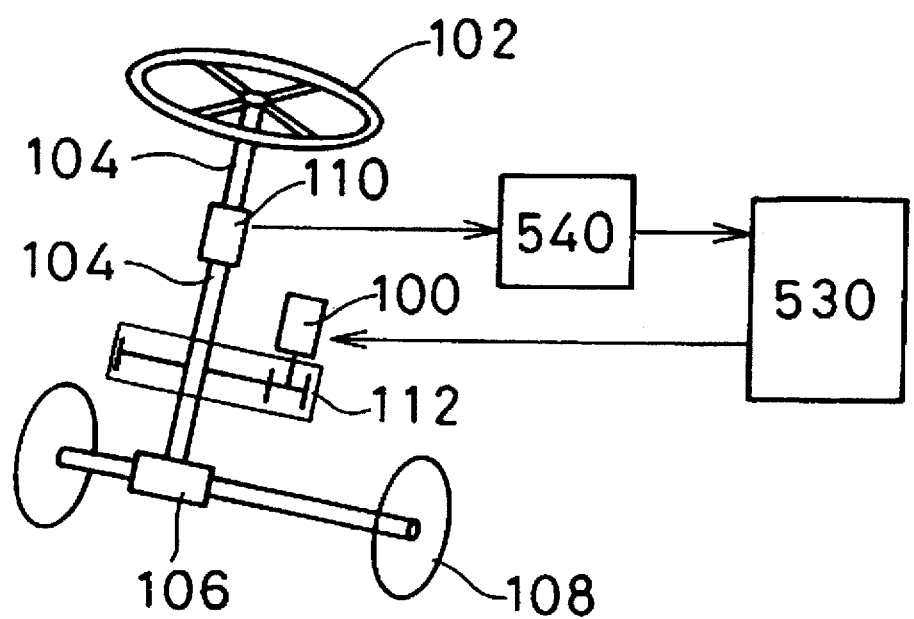
FIG. 11 is a block diagram showing the entire structure of an electric power steering apparatus according to an eighth embodiment of the present invention.

FIG. 11 shows the entire structure of the electric power steering apparatus according to the eighth embodiment of the present invention.

In FIG. 11, an induction motor is indicated at 100, a steering wheel is indicated at 102, a steering shaft is indicated at 104, a steering gear is indicated at 106, a wheel is indicated at 108, a steering force sensor is indicated at 110, a reduction gear is indicated at 112, a control system for an induction motor is indicated at 530, and a motor torque converter is indicated at 540.

The operation of the electric power steering apparatus having such a structure will be described with reference to FIG. 11.

According to a steering apparatus which does not generate auxiliary steering force, a steering wheel 102 provided on a steering shaft 104 is operated so that a wheel 108 is steered through a steering gear 106. In the electric power steering apparatus according to the present embodiment, an induction motor 100 is coupled to the steering shaft 104 through a reduction gear 112. When the induction motor 100 is driven, an auxiliary steering force is generated. In order for the induction motor 100 to give the desired auxiliary steering force according to the output of the steering sensor 110 attached to the steering shaft, the motor torque converter 540 converts the output of the steering force sensor 110 into the command torque of the motor, the command torque thus obtained is sent to the control system 530 according to the sixth or seventh embodiment so that the induction motor 100 is controlled.

When an induction motor having no permanent magnet is used in the same way as the present embodiment, it is in a free condition even though the wiring to a motor may be short-circuited for some reason. Consequently, the electric power steering apparatus works as a steering apparatus which cannot produce an auxiliary steering force. Therefore, it is not necessary to use a clutch as a safety mechanism which separates a motor from a steering shaft. The clutch is required for a DC motor having a permanent magnet, because the motor performs dynamic braking in the case of short-circuit and steering cannot be operated in the worst case. Consequently, there are some problems with respect to safety.

In the case where the induction motor is controlled by an inverter according to the prior art, the precision in torque control is poor and the starting torque cannot be increased. Accordingly, the inverter control according to the prior art is not suitable for electric power steering.

As described above, the induction motor is used to generate the auxiliary steering force in the electric power steering apparatus and the control system for an induction motor according to the sixth and seventh embodiments is used to drive the induction motor. Consequently, a safety mechanism such as a clutch can be omitted because it is not necessary for original functions. In addition, the speed detector of the induction motor is not required, so that the size can be reduced and the structure can be simplified.

The motor torque converter 540 determines the command torque to the motor based on the output of the steering force sensor 110. In the case where the running speed of a vehicle is increased, the auxiliary steering force may be reduced or the command torque may be changed according to a steering angle so as to get good steering feeling. Thus, the command torque can be determined in consideration of the speed of the vehicle, the steering angle and the like.

According to the present invention, an electric power steering apparatus can be implemented, wherein a motor having no permanent magnet is controlled with respect to the steering force and the auxiliary steering force is generated on a steering system so that an additional mechanism such as a clutch is not required, the size can be reduced, the structure can be simplified and steering can be performed at the time of failure.

Further, the present invention provides a control system for an induction motor comprising current detectors for measuring or estimating the stator currents; a dq-axis current converter for converting the output of the current detectors into the two-phase alternating current of a predetermined d-axis stator current in the d-axis direction and a q-axis stator current in the q-axis direction whose phase has a difference of 90° from the d-axis phase; a rotor flux estimator for estimating a d-axis rotor flux in the d-axis direction and a q-axis rotor flux in the q-axis direction of the induction motor; a first speed estimator for calculating a numerator portion A of an estimated speed from the d-axis stator current, the d-axis rotor flux and a constant unique to the induction motor, and dividing the numerator portion A of the estimated speed by the q- axis rotor flux so as to estimate the rotational speed of the induction motor; a second speed estimator for calculating a numerator portion B of an estimated speed from the q-axis stator current, the q-axis rotor flux and a constant unique to the induction motor, and dividing the numerator portion B of the estimated speed by the d-axis rotor flux so as to estimate the rotational speed of the induction motor; an estimated speed switch for switching the output values of the first and second speed estimators so as to determine the rotational speed of the induction motor, and rotational speed control means for comparing the command speed of the induction motor with the output of the estimated speed switch so as to change the amplitude of the torque current component, and for changing the phase of the stator current group based on the amplitude of the torque exciting current component and the output of the estimated speed switch so as to control the rotational speed of the induction motor. Consequently, the output torque or rotational speed of the induction motor can always be controlled with high precision, and a good response can be obtained.

The invention may be embodied in other forms without departing from the spirit or essential characteristics thereof. The embodiments disclosed in this application are to be considered in all respects as illustrative and not restrictive, the scope of the invention is indicated by the appended claims rather than by the foregoing description, and all changes which come within the meaning and range of equivalency of the claims are intended to be embraced therein.

What is claimed is:

1. A control system for an induction motor for independently commanding torque current components and exciting current components of a stator current group sent to the stator of an induction motor, and for changing the amplitude and the frequency of the stator current group so as to control the induction motor comprising;

a torque detector for detecting an output torque of the induction motor, and torque control means for changing the amplitude of the stator current group based on a command torque of the induction motor and the amplitude of a predetermined exciting current component, and for changing the frequency of the stator current group based on the amplitude of the exciting current component, the command torque and the output of the torque detector so as to control the output torque of the induction motor.

2. The control system for an induction motor according to claim 1, further comprising;

a current detector for measuring or estimating the stator current group, a dq-axis current converter for converting the output of the current detector into a two-phase alternating current of a predetermined d-axis stator current in a d-axis direction and a q-axis stator current in a q-axis direction whose phase differs by 90° from the d-axis direction, a rotor flux estimator for estimating a d-axis rotor flux in the d-axis direction and a q-axis rotor flux in the q-axis direction of the induction motor, wherein the torque detector estimates the output torque of the induction motor from the d-axis stator current, the q-axis stator current, the d-axis rotor flux and the q-axis rotor flux.

3. The control system for an induction motor according to claim 1, wherein the torque control means changes the amplitude and frequency of the stator current group based on the command torque of the induction motor and the amplitude of the predetermined exciting current component, compares the command torque with the output of the torque detector so as to correct the frequency of the stator current group.

4. A control system for an induction motor for independently commanding a torque current component and an exciting current component of a stator current group supplied to a stator of an induction motor, and changing an amplitude and a phase of the stator current group to control an output torque of the induction motor, comprising;

a current detector for measuring or estimating the stator current group, a dq-axis current converter for converting the output of the current detector into a two-phase alternating current of a predetermined d-axis stator current in a d-axis direction and a q-axis stator current in a q-axis direction whose phase differs by 90° from the d-axis direction, a rotor flux estimator for estimating a d-axis rotor flux in the d-axis direction and a q-axis rotor flux in the q-axis direction of the induction motor, a first speed estimator for calculating a first numerator portion of an estimated speed from the d-axis stator current, the d-axis rotor flux and a constant unique to the induction motor, and dividing the first numerator portion of the estimated speed by the q-axis rotor flux so as to estimate the rotational speed of the induction motor, a second speed estimator for calculating a second numerator portion of an estimated speed from the q-axis stator current, the q-axis rotor flux and a constant unique to the induction motor, and dividing the second numerator portion of the estimated speed by the d-axis rotor flux so as to estimate the rotational speed of the induction motor, an estimated speed switch for switching between output values of the first and second speed estimators so as to determine the rotational speed of the induction motor, and torque control means for determining the amplitude of the torque current component based on a command torque of the induction motor, and changing the phase of the stator current group based on the amplitude of the torque current component, the amplitude of a predetermined exciting current component and the output of the estimated speed switch so as to control the output torque of the induction motor.

5. The control system for an induction motor according to claim 4, further comprising a rotational speed control means for comparing a command speed of the induction motor with the output of the estimated speed switch so as to compute the command torque of the induction motor, wherein the torque current component and the exciting current component of the stator current group supplied to the stator of the induction motor are independently commanded, and the amplitude and phase of the stator current group are changed to control the rotational speed of the induction motor.

6. The control system for an induction motor according to claim 5, wherein the rotational speed control means includes torque current command value generating means for comparing the command speed of the induction motor with the output of the estimated speed switch so as to change the amplitude of the command value of the torque current component, phase converting means for changing the phase of a command value of the stator current group based on the amplitude of the command value of the torque current component, the amplitude of a command value of the predetermined exciting current component and the output of the estimated speed switch, dq-axis current command value generating means for generating the command values of the d- and q-stator currents based on the amplitude of the command value of the torque current component, the amplitude of a command value of the exciting current component and the output of the phase converting means, current control means to output d- and q-axis control signals so that the output of the dq-axis current converter matches the corresponding command value of the dq-axis current command value generating means, and control signal distributing means for convening the output of a current control means into a control signal of a stator current output unit which outputs the stator current group, and wherein the rotor flux estimator estimates the d- and q-axis rotor fluxes based on the output of the dq-axis current converter, the output of the current control means and a constant unique to the induction motor.

7. The control system for an induction motor according to claim 4, wherein the estimated speed switch compares the absolute value of one of the d- and q-axis rotor fluxes with a predetermined threshold, switches to the output of the first speed estimator if the absolute value is smaller than the threshold, and switches to the output of the second speed estimator if the absolute value is greater than the threshold so as to determine the rotational speed of the induction motor.

8. The control system for an induction motor according to claim 4, wherein the estimated speed switch switches to the output of the first speed estimator if the absolute value of the d-axis rotor flux is smaller than that of the q-axis rotor flux, and switches to the output of the second speed estimator if the absolute value of the d-axis rotor flux is greater than that of the q-axis rotor flux so as to determine the rotational speed of the induction motor.

9. The control system for an induction motor according to claim 4, wherein the estimated speed switch switches between the output of the first speed estimator and that of the second speed estimator based on the phase of the stator current group so as to determine the rotational speed of the induction motor.

10. The control system for an induction motor according to claim 4, wherein the estimated speed switch compares the absolute values of the d- and q-axis rotor fluxes with a predetermined threshold, and outputs the information that the induction motor is stopped if the absolute values of the d- and q-axis rotor fluxes are smaller than the predetermined threshold.

11. The control system for an induction motor according to claim 4, wherein the torque control means includes phase converting means for determining the amplitude of a command value of the torque current component based of the command torque of the induction motor and changing the phase of a command value of the stator current group based on the amplitude of the command value of the torque current component, the amplitude of a command value of the predetermined exciting current component and the output of the estimated speed switch, stator current command value generating means for generating the command value of the stator current group based on the amplitude of the command value of the torque current component, the amplitude of a command value of the exciting current component and the output of the phase converting means, and current control means to output a control signal group so that the output of the current detector matches the corresponding command value of the stator current command value generating means, and wherein the rotor flux estimator includes dq-axis control signal converter for converting the control signal group of the current control means into a d-axis control signal in the d-axis direction and a q-axis control signal in the q-axis direction so as to estimate the d- and q-rotor fluxes based on the output of the dq-axis current converter, the output of the dq-axis control signal converter and a constant unique to the induction motor.

* * * * *